Figure 1:
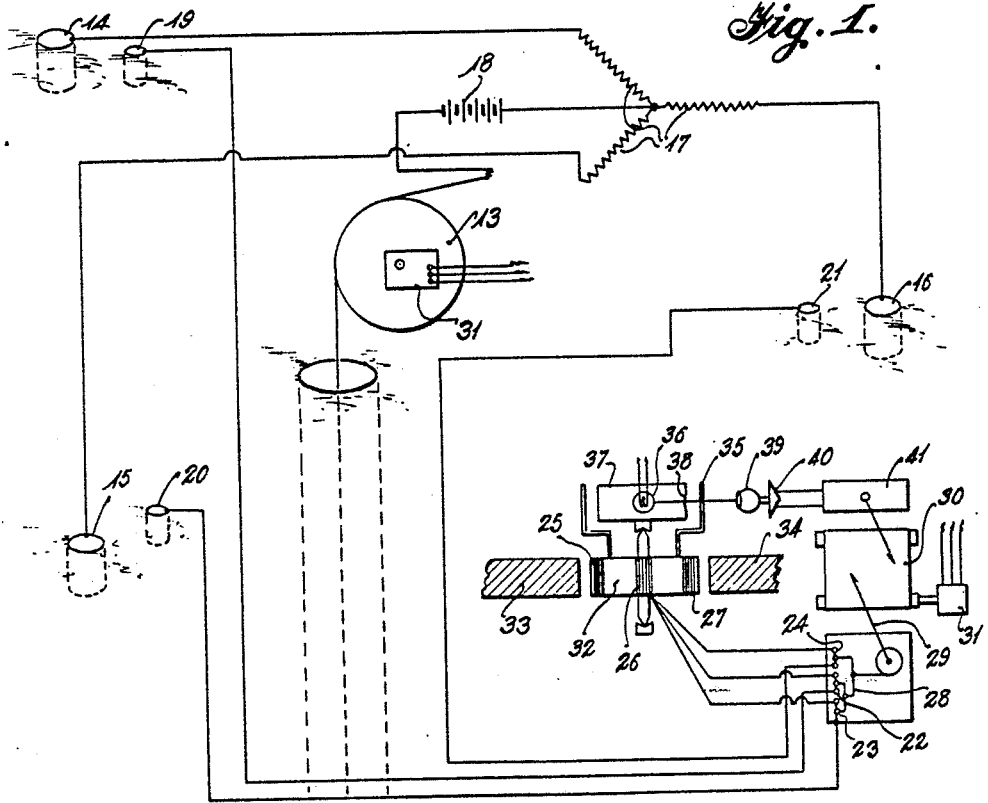

Aug. 10, 1943.  R. F. DAVIS  2,326,640
APPARATUS FOR DETERMINING THE DIP IN THE EARTH'S SUBSTRATA
Filed Jan. 29, 1941

Inventor
Robert F. Davis
By Stevens and Davis
Attorneys

Patented Aug. 10, 1943

2,326,640

UNITED STATES PATENT OFFICE 2,326,640

APPARATUS FOR DETERMINING THE DIP IN THE EARTH'S SUBSTRATA

Robert F. Davis, Washington, D. C., assignor to Well Surveys, Incorporated, Tulsa, Okla., a corporation of Delaware Application January 29, 1941, Serial No. 376,528

4 Claims. (Cl. 175—182)

This invention relates to geophysical prospecting and particularly to a method of electrical resistance prospecting of the strata lying adjacent to a drill hole or other opening in the earth.

Numerous methods of determining the degree of and direction of the slope of underground strata by measurements of electrical resistance have been suggested, but in every case heretofore it has been necessary to use relatively complicated apparatus and to perform intricate calculations on the results obtained in order to arrive at any worthwhile conclusions.

It is the purpose of the present invention to provide a method and apparatus that is relatively simple and inexpensive and yet which will give an accurate indication of the direction or azimuth of the slope or dip of underground strata and its magnitude, and also considerable information about the interfaces between subsurface strata, without the necessity for complicated apparatus or long difficult calculations.

Briefly, the present invention provides for the establishment of at least three symmetrically arranged fields of electrical current about a drill hole. If the subsurface structure is homogeneous the three fields will be symmetrical and if not they will vary from symmetry in accordance with the variations of the formations. Means are then provided for directly comparing the symmetry of the fields and by this direct comparison obtaining an indication of the direction and extent of any slope or change in slope of the subsurface strata.

Provision is further made for either periodic or continuous rearrangement of the electrical fields so that they extend deeper or less deep into the earth. By comparing the indications obtained from fields extending to different depths it becomes possible to determine the direction and magnitude of the slope of individual strata.

Further details and advantages of this invention will be apparent from the following specific description of the embodiment shown in the appended drawing.

In the drawing

Figure 3:
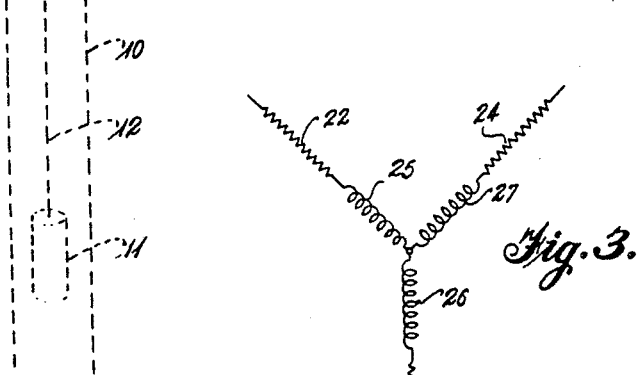
Figure 2:
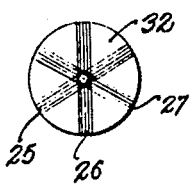

Figure 1 is a diagrammatic illustration of a simple form of an apparatus constructed according to this invention, Figure 2 is essentially a top plan view of the dip indicator rotor, and Figure 3 is a diagrammatic circuit of the Y inductor.

As illustrated in Figure 1 a device constructed according to this invention is being used to determine the arrangement and nature of the subsurface strata surrounding a drill hole 10. For this purpose an electrode 11 is lowered into the well at the end of a cable 12 and the depth to which it is lowered is measured by a measuring wheel 13 over which the cable passes on its way to the well.

Three additional electrodes 14, 15 and 16 are placed in the earth at equal distances from the well in directions 120° apart. These three electrodes are connected together through a Y resistor 17 to the center of which is connected one pole of a battery 18. The other pole of this battery is connected through the cable 12 to the electrode in the well. With such an arrangement a current flows between each of the electrodes on the surface and the electrode in the well to establish three fields of current flow which will be symmetrical if the earth is homogeneous but will be unsymmetrical if the earth is not homogeneous.

Spaced a short distance from each of the surface electrodes 14, 15 and 16 are measuring electrodes 19, 20 and 21, respectively, also placed in the surface of the earth and preferably each spaced the same distance from and in the same relation to the corresponding power electrode.

With these measuring electrodes so placed each will be sensitive to the shape of the field of its power electrode and its potential will depend upon the shape of that field. In order to take advantage of this fact the three measuring electrodes would be connected together through a Y inductor and a compass needle suspended freely close over the center of this Y inductor to indicate the current flow balance in inductance.

In such a case the direction in which the compass needle was caused to point would be an indication of the direction or azimuth of the dip or other irregularity in the structure. Obviously, all of the structure between the electrode in the well and the electrodes on the surface would affect this indication so that the compass needle would indicate the average direction of the dip and not the direction of the dip of any one particular strata.

Furthermore, the compass needle would not indicate the extent of the dip but only the direction or azimuth. Therefore, it would be desirable in most instances to measure the amount of the current flow in the three branches of the Y inductor to get an indication of the extent of the dip. In certain instances it has also been found desirable as the well electrode is lowered into the hole and additional strata come within the electrical field, to measure the rate of change of the compass needle indication and also to measure the rate of change of the current flow in order to get an indication of the change taking place in the direction or extent of dip.

In order to accomplish the measurement of the total direction and extent of dip or other variations in such a manner that it can be expediently recorded the three measuring electrodes 19, 20 and 21 have been shown in Figure 1 as connected through the elements of three hot wire ammeters 22, 23 and 24, respectively, to the ends of three inductor branch coils 25, 26 and 27, respectively, the opposite ends of which are connected together. The electrical circuit of this arrangement is shown somewhat more clearly in a schematic way in Figure 3.

The three hot wire ammeter elements are further shown in Figure 1 as connected differentially together by a series of levers 28, connected to operate a pen 29 of a recorder 30. The tape of the recorder 30 is driven from the measuring wheel 13 through an electrical transmission 31 which may conveniently be of the "Selsyn" motor variety. Thus the total current flowing in the measuring circuit is constantly recorded and correlated with the depth of the well electrode 11.

The three inductance coils 25, 26 and 27 are mounted on a rotor 32 positioned between permanent magnets 33 and 34 so that it will rotate in accordance with the current balance in the three coils 25, 26 and 27. Mounted on this rotor is a cylindrical screen 35 which is relatively transparent to light at one point and of progressively less transparency as progress is made around it in a circumferential direction. Within this screen is a source of light 36 and an enclosure 37 with a slit opening 38 which permits light to be emitted only through a very small area of the screen 35. As the rotor 32 revolves the screen is revolved with it, the area through which light may pass is changed and the amount of light which passes through the screen is changed due to the change in transparency of the portion of the screen through which the light is being transmitted.

The cylindrical screen 35 may conveniently be a piece of photographic film that has been progressively exposed to more and more light and thereafter uniformly developed to produce a screen of progressively diminishing transparency. The light which passes through the screen is received by a photoelectric cell 39 the output of which is amplified by an amplifier 40. The output of the amplifier 40 serves to operate a pen 41 of a recorder the tape of which is driven in accordance with the movements of the measuring wheel 13 as was the recorder 30. As shown in Figure 1 the same recording tape is used for both recorders so that the record of the direction of dip and the record of the extent of dip are recorded side by side.

The data as to rate of change with change of depth, referred to in an earlier paragraph, may be obtained by manually or mechanically or electrically performing derivations on the curves produced by the operation of the device described. This data may also be obtained directly from the measuring device by including an electrical derivating circuit in the leads coming from each one of the measuring electrodes. Electrical derivating circuits are well known and hence have not been illustrated.

It will be apparent to those skilled in the art that other means than a differential arrangement of hot wire ammeters may be used to advantage in determining the total current flow and that numerous other arrangements may be provided for recording the current balance between the three measuring electrode circuits. It will also be apparent to those skilled in the art that both totals and derivatives may be measured and recorded if desired.

Reference has been made herein for convenience in explanation to the electrical fields around the drill hole being symmetrically arranged. It should be understood, however, that some variation from perfect symmetry is permissible and that such variation may be compensated by variations from symmetry of the measuring circuit or the current distribution to the power electrodes. Numerous other modifications in the specific method and apparatus above described may also be made within the scope of this invention.

I claim:

1. A device for determining the nature of subsurface formations that comprises means to establish at least three electrical current fields radially disposed about an opening in the earth in different directions, a measuring electrode positioned in each of said fields, a series of inductances, one connected to each of said measuring electrodes, and having their opposite ends connected together, said inductances being arranged in a pattern similar to that of the electrical field about the opening in the earth, and a rotatable indicator placed so as to be controlled by currents flowing through said inductances.

2. A device for determining the nature of subsurface formations that comprises an electrode adapted to be lowered into an opening in the earth, means to measure the depth to which said electrode is lowered, a source of power having one terminal connected to said electrode, a Y resistance to the center of which the other pole of said power source is connected, surface power electrodes connected to the opposite ends of said Y resistance and adapted to be located in the surface of the earth and in a generally symmetrical arrangement around the mouth of the bore hole, a measuring electrode positioned in the vicinity of each of said surface power electrodes, a Y inductance connecting said measuring electrodes and arranged so that the arms of said inductances are in substantially the same position relative to each other as are the surface power electrodes, and means for indicating the direction of the resulting magnetic field around said inductances.

3. A device for determining the nature of subsurface formations that comprises an electrode adapted to be lowered into an opening in the earth, means to measure the depth to which said electrode is lowered, a source of power having one terminal connected to said electrode, a Y resistance to the center of which the other pole of said power source is connected, surface power electrodes connected to the opposite ends of said Y resistance and adapted to be located in the surface of the earth and in a generally symmetrical arrangement around the mouth of the bore hole, a measuring electrode positioned in the vicinity of each of said surface power electrodes, a Y inductance connecting said measuring electrodes and arranged so that the arms of said inductances are in substantially the same position relative to each other as are the surface power electrodes, means for indicating the direction of the resulting magnetic field around said inductances and means to measure the total current in said inductances.

4. A device for determining the nature of subsurface formations that comprises an electrode adapted to be lowered into an opening in the earth, means to measure the depth to which said electrode is lowered, a source of power having one terminal connected to said electrode, a Y resistance to the center of which the other pole of said power source is connected, surface power electrodes connected to the opposite ends of said Y resistance and adapted to be located in the surface of the earth and in a generally symmetrical arrangement around the mouth of the bore hole, a measuring electrode positioned in the vicinity of each of said surface power electrodes, a Y inductance connecting said measuring electrodes and arranged so that the arms of said inductances are in substantially the same position relative to each other as are the surface power electrodes, means for indicating the direction of the resulting magnetic field around said inductances and means to record said indication in correlation with an indication of the depth of the electrical field.

ROBERT F. DAVIS.